Patented Oct. 4, 1949

2,483,435

UNITED STATES PATENT OFFICE 2,483,435

BETA-BENZOHYDRYLOXYETHYLAMINES AND PROCESS FOR PREPARING

George Rieveschl, Jr., Grosse Pointe Woods, Mich., assignor to Parke, Davis & Company, Detroit, Mich., a corporation of Michigan No Drawing. Application August 5, 1946, Serial No. 688,425

13 Claims. (Cl. 260—570)

This invention relates to amino ethers and to a method of obtaining the same. More particularly, the invention relates to basically substituted benzhydryl ethers and their acid addition salts. The free bases of the basically substituted benzhydryl ethers of the present invention have the formula,

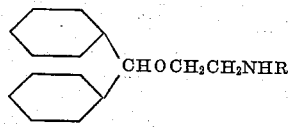

where R is a lower alkyl or lower alkenyl radical.

In accordance with the invention, the amino ethers may be obtained as a free base having the formula given above or as an acid addition salt of the base with an inorganic or organic acid. Some examples of the salts which may be prepared by the methods hereinafter described are the hydrochloride, hydrobromide, hydroiodide, sulfate, phosphate, acetate, citrate, oxalate, succinate, benzoate, tartrate, phthalate, maleate, oleate and the like.

It has been found that the compounds of the present invention may be obtained by the reaction of a β-haloethyl benzhydryl ether with a primary amine of the formula, RNH₂ where R is a lower alkyl or lower alkenyl radical. The reaction can be carried out with or without a solvent. Some of the solvents which can be used are water, alcohol, acetone, dioxane, ether, benzene, carbon tetrachloride and the like.

It has also been found that the reaction may be effected by either allowing the reaction mixture to stand for one or two weeks or by heating the reaction mixture until no further amine acid addition salt is formed. This usually requires heating the mixture for about twelve or more hours. When amines having a low boiling point such as methylamine, ethylamine and isopropyl amine are used, it is preferable to heat the reaction mixture in a closed vessel to prevent loss of the amine from the reaction mixture.

Another modification which can be made in this process involves the use of an alkaline material to react with the mineral acid formed during the reaction. When the reaction is carried out in the presence of such materials a smaller quantity of amine is required since the amine is not removed from the reaction by salt formation. In general, when no acid-binding agent is used in the reaction it is preferable to use about two or more equivalents of amine to each equivalent of β-haloethyl benzhydryl ether but when an acid-binding agent is used this quantity can be reduced without materially altering the yield of the final product. Some of the alkaline substances which may be used in the process are alkali metal hydroxides, oxides, alcoholates, carbonates, bicarbonates, acetates and the like. The alkaline earth metal hydroxides, oxides and carbonates may also be used.

The basically substituted benzhydryl ethers and their acid addition salts are useful for several different purposes. For example, the lower homologs such as β-methyl-aminoethyl benzhydryl ether are powerful antihistamine agents and find particular use in the treatment of smooth muscle spasms and allergic conditions due to histamine. These compounds, particularly those having three or more carbon atoms in the alkyl or alkenyl group, exhibit antispasmodic activity several times greater than that shown by such well-known antispasmodics as papaverine. Some of these compounds, notably β-allylaminoethyl benzhydryl ether and the alkyl compounds having more than four carbon atoms in the alkyl radical, are useful local anesthetics. In addition to their use as medicinals the new amino ethers are also useful as intermediates in the preparation of other organic compounds.

This application is a continuation-in-part of my copending application, Serial No. 531,639, filed April 18, 1944, now patent No. 2,421,714 issued June 3, 1947.

The invention is illustrated by the following examples.

*Example 1.* — *β - Methylaminoethyl benzhydryl ether*

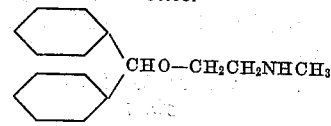

12.3 g. of β-chloroethyl benzhydryl ether is added to 100 g. of 22% methylamine solution in methanol. The mixture is placed in a pressure bottle and heated at 100° C. for twenty-four hours. The methanol and excess methylamine are removed by distillation, the residue diluted with ether and the mixture treated with 100 cc. of water. The organic layer is separated, washed with several portions of water and extracted with two or three portions of 3 N hydrochloric acid. The acidic extracts are decolorized with charcoal, filtered and the free base liberated by the addition of excess 10% sodium hydroxide solution. The base is extracted with ether, the ether extracts dried and treated with an excess of alcoholic hydrogen chloride. The hydrochloride salt of β-methylaminoethyl benzhydryl ether which separates is collected and purified by recrystallization from alcohol - ether mixture; M. P. 159–60° C.

If desired, the free base of β-methylaminoethyl benzhydryl ether may be obtained by evaporation of the ether from dry ether solution of the base and distillation of the residue in vacuo. The base is obtained as a colorless oil boiling at 147–8° C./1.5 mm.

β-Methylaminoethyl benzhydryl hydrochloride is particularly effective as an antihistamine agent and as such finds particular use in the treatment of smooth muscle spasms and allergic conditions due to histamine. The usual dosage is about 300 mg. per day orally or 40 mg. by the intravenous route.

*Example 2.—β-Ethylaminoethyl benzhydryl ether*

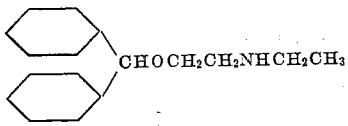

A mixture consisting of 23.4 g. of β-chlorethyl benzhydryl ether and 50 g. of 70% aqueous ethylamine is placed in a pressure vessel and heated at 100° C. for twenty-four hours. The vessel is opened and the excess ethyl amine distilled from the reaction mixture. The residue is treated with 200 cc. of water and 300 cc. of ether and the ether layer drawn off. The ether layer is washed well with water, the ether distilled and the residue distilled under reduced pressure to obtain the free base of the desired β-ethylaminoethyl benzhydryl ether as a colorless oil.

The free base may be converted to an acid addition salt by dissolving it in dry ether and treating the resultant solution with an ether or alcohol solution of an organic or inorganic acid. Thus, for example, if an alcoholic solution of hydrogen chloride is added to an ether solution of the free base the hydrochloride salt of β-ethylaminoethyl benzhydryl ether is obtained; M. P. 171.5–172.5° C., (after recrystallization from isopropanol-ether mixture). Likewise, the acid oxalate acid addition salt may be obtained by treating an isopropanol solution of the free base with a saturated solution of oxalic acid dihydrate in isopropanol. The salt separates from the solution as a white crystalline solid which may be purified by recrystallization from isopropanol.

The compounds of this example, like the compounds of Example 1, are particularly useful as antihistamine agents. As antispasmodics these compounds are more effective than papaverine.

*Example 3.—β-n-Propylaminoethyl benzhydryl ether*

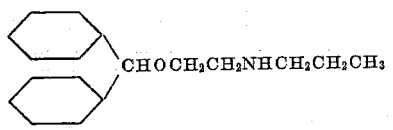

29.1 g. of β-bromoethyl benzhydryl ether and 41.2 cc. of n-propyl amine are placed in a pressure bottle and heated at 100° C. for twenty-four hours. The bottle is cooled and the contents treated with 700 cc. of water and 150 cc. of ether. The organic layer is removed and the aqueous layer extracted with a fresh portion of ether. The combined ether extracts are washed with water and finally with saturated sodium chloride solution. After drying the ether solution over solid potassium hydroxide, the hydrobromide salt is precipitated by the addition of an alcoholic solution of hydrogen bromide. The crystalline salt is collected and purified by recrystallization from isopropanol-petroleum ether mixture. The hydrochloride salt can be obtained in a similar manner; M. P. 137–8° C.

The compounds of this example are effective antihistamine agents and are useful in the treatment of allergic conditions due to histamine. They are also useful antispasmodics, being three times more effective than the well-known antispasmodic, papaverine.

*Example 4.—β-Allylaminoethyl benzhydryl ether*

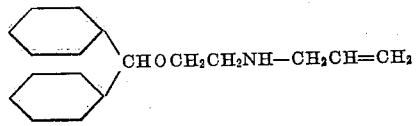

A mixture consisting of 29.1 g. of β-bromoethyl benzhydryl ether and 38 cc. of allyl amine is placed in a pressure bottle and heated at 100° C. for twenty-four hours. The bottle is cooled, opened and the excess allyl amine distilled off. The residue is diluted with ether and washed with three 200 cc. portions of water. The aqueous washings are discarded and the organic layer extracted with several portions of 3 N hydrochloric acid. During the extraction the hydrochloride starts to crystallize from the aqueous solution. The acidic extracts are made alkaline with 10% sodium hydroxide solution and the oily free base extracted with ether. The ether solution is dried and treated with an excess of dry hydrogen chloride in ethanol. The hydrochloride salt of β-allylaminoethyl benzhydryl ether which separates from the solution is collected and purified by recrystallization from isopropanol-ligroin or from absolute alcohol-ether mixture; M. P. 140–1° C.

The citrate salt of the product can be obtained by adding an ether solution of citric acid to the ether solution of the free base. The salt separates from the solution as a finely divided white powder which may be purified by washing it with ether or by recrystallization from isopropanol-ether mixture.

In a similar manner other salts such as the hydrobromide salt may be prepared by adding an alcoholic solution of the acid to an ether solution of the free base.

The compounds of this example are particularly useful as local anesthetics but they also exhibit antispasmodic properties several times greater than papaverine.

*Example 5.—β-Isoproplyaminoethyl benzhydryl ether*

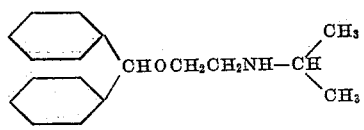

A mixture consisting of 29.1 g. of β-bromoethyl benzhydryl ether and 67.6 cc. of isopropylamine is heated in a pressure bottle at 100° C. for seventeen hours. The bottle is opened and the excess isopropylamine removed by distillation. The residue is treated with 300 cc. of water and 300 cc. of ether and the layers separated. The organic layer is washed with three more portions of water, the washings discarded and the free base extracted from the ether solution with 3 N hydrochloric acid. The acidic extracts are rendered alkaline by the addition of 10% sodium hydroxide solution and the free base which separates taken up in ether. The ether solution is washed with water, then with saturated sodium chloride solution and finally dried over potassium hydroxide. The drying agent is removed by filtration and the filtrate treated with an excess of alcoholic hydrogen chloride. The white crystalline hydrochloride of β-isopropylaminoethyl benzhydryl ether which separates from the solution is collected and recrystallized from isopropanol; M. P. 168-9° C.

The compounds of this example exhibit marked antihistamine properties and are useful in the treatment of smooth muscle spasms and allergic conditions due to histamine.

*Example 6.—β-n-Butylaminoethyl benzhydryl ether*

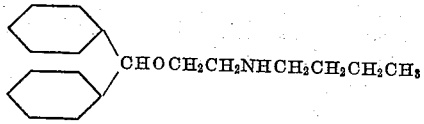

A mixture consisting of 29.1 g. of β-bromoethyl benzhydryl ether and 29.2 g. of n-butylamine is heated on a steam bath for sixty hours. At the end of this time excess n-butylamine is distilled from the light brown colored solution. The residue is diluted with 600 cc. of water and extracted with two 200 cc. portions of ether. The combined ether extracts are washed with water, the washings discarded and the ether solution of the free base charcoaled. After filtration, an excess of alcoholic hydrogen chloride is added to the solution which causes the hydrochloride salt to separate as a flocculent mass. The salt is collected and purified by recrystallization from ethyl acetate-ether mixture; M. P. 84-85° C.

The hydrochloride of β-n-butylaminoethyl benzhydryl ether possesses antispasmodic properties and is about three times more effective than papaverine. This compound also shows local anesthetic properties.

*Example 7.—β-Isobutylaminoethyl benzhydryl ether*

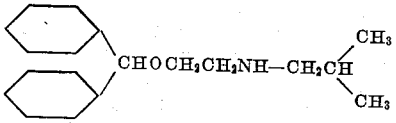

A mixture consisting of 29.1 g. of β-bromoethyl benzhydryl ether and 50 cc. of isobutylamine is refluxed on a steam bath for thirty hours. The excess amine is removed by distillation and the residue, after dilution with ether, washed with three 300 cc. portions of water. The ether solution of the free base is dried and treated with an excess of alcoholic hydrogen bromide. The crystalline hydrobromide salt of β-isobutylaminoethyl benzhydryl ether which separates is collected and purified by recrystallization from isopropanol-ligroin mixture.

In a similar manner, by treating the ether solution of the free base with alcoholic hydrogen chloride one obtains the hydrochloride salt of β-isobutylaminoethyl benzhydryl ether; M. P. 123-5° C.

The compounds of this example, like the n-butyl derivatives of the previous example, show both local anesthetic and antispasmodic properties.

*Example 8.—β-sec.-Butylaminoethyl benzhydryl ether*

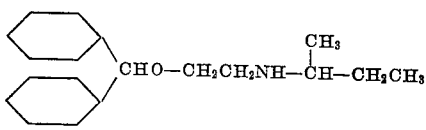

29.1 g. of β-bromoethyl benzhydryl ether and 79 cc. of sec.-butyl amine are heated at 100° C. for forty hours. The excess amine is distilled off and the residue diluted with ether. The ether solution is washed well with water and dried over anhydrous potassium carbonate. The drying agent is removed by filtration and the ether solution of the free base treated with an excess of hydrogen iodide in alcohol. The hydroiodide of β-sec.-butylaminoethyl benzhydryl ether which separates from the solution is collected and purified by recrystallization from isopropanol-ether mixture.

In a similar manner the hydrochloride is obtained by adding a solution of alcoholic hydrogen chloride to an ether solution of the free base; M. P. 140–1° C. (after recrystallization from isopropanol-petroleum ether mixture).

These compounds exhibit local anesthetic and antispasmodic properties.

*Example 9.—β - n - Amylaminoethyl benzhydryl ether*

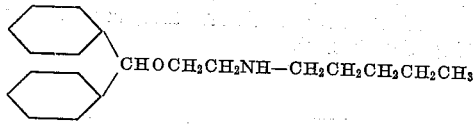

A mixture consisting of 33.8 g. of β-iodoethyl benzhydryl ether and 34.4 g. of n-amylamine is heated on a steam bath for fifteen hours. The excess amine is removed by distillation and the residue taken up as completely as possible in ether. The ether solution of the free base is washed well with water, dried over potassium carbonate and the drying agent removed by filtration. The filtrate is treated with an excess of dry hydrogen chloride gas and the hydrochloride salt which separates collected and purified by recrystallization from isopropanol-petroleum ether mixture.

The β-halogen ethyl ethers used as starting materials in the preparation of the compounds of the present invention may be prepared by the method described below for the preparation of β-bromoethyl benzhydryl ether.

494 g. of benzhydryl bromide, 206 g. of anhydrous sodium carbonate and 313 g. of ethylene bromohydrin are heated and stirred at 120 to 130° C. for eight hours. Carbon dioxide is evolved during the reaction. 500 cc. of benzene are added with stirring, the precipitate filtered off and washed with benzene. The benzene is removed by distillation and the β-bromoethyl benzhydryl ether distilled in vacuo; B. P. 169-72° C./2 mm.

Attention is called to the following copending applications which are somewhat related: Serial No. 640,685, filed January 11, 1946; Serial No. 640,686, filed January 11, 1946; Serial No. 640,687, filed January 11, 1946; Serial No. 660,406, filed April 8, 1946; Serial No. 688,420, filed August 5, 1946; Serial No. 688,421, filed August 5, 1946; Serial No. 688,422, filed August 5, 1946; Serial No. 688,423, filed August 5, 1946; Serial No. 688,424, filed August 5, 1946, now Patent No. 2,453,729; Serial No. 688,426, filed August 5, 1946, now Patent No. 2,437,711; Serial No. 688,427, filed August 5, 1946; Serial No. 739,985, filed April 8, 1947, now Patent No. 2,427,878; Serial No. 751,983, filed June 2, 1947, now Patent No. 2,454,092; Serial No. 751,984, filed June 2, 1947; Serial No. 751,985, filed June 2, 1947, now Patent No. 2,455,949; Serial No. 780,099, filed October 15, 1947; Serial No. 15,257, filed March 16, 1948; and Serial No. 33,432, filed June 16, 1948.

What I claim as my invention is:
1. A compound of the class consisting of a free base and its acid addition salts, said free base having the formula

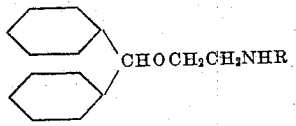

where R is a member of the class consisting of lower alkyl and lower alkenyl radicals.

2. A compound of the class consisting of a free base and its acid addition salts, said free base having the formula

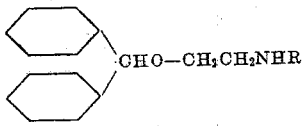

where R is a lower alkyl radical.

3. A compound of the class consisting of a free base and its acid addition salts, said free base having the formula

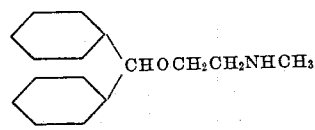

4. A compound of the formula

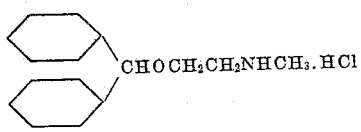

5. A compound of the class consisting of a free base and its acid addition salts, said free base having the formula

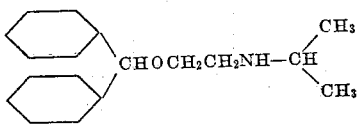

6. A compound of the formula

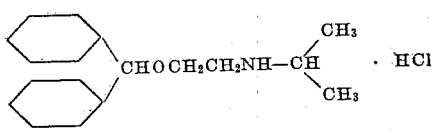

7. A compound of the class consisting of a free base and its acid addition salts, said free base having the formula

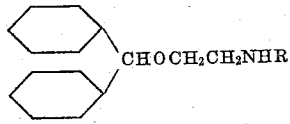

where R is a lower alkenyl radical.

8. A compound of the class consisting of a free base and its acid addition salts, said free base having the formula

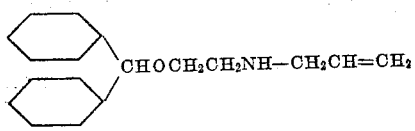

9. A compound of the formula

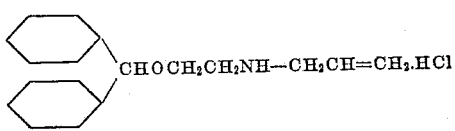

10. Process for obtaining a basically substituted benzhydryl ether of the formula

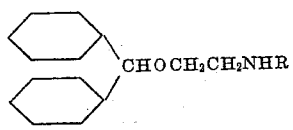

which comprises reacting a β-haloethyl benzhydryl ether with a primary amine of the formula

R—NH$_2$ where R is a member of the class consisting of lower alkyl and lower alkenyl radicals.

11. Process for obtaining β-methylaminoethyl benzhydryl ether which comprises reacting a β-haloethyl benzhydryl ether with methyl amine.

12. Process for obtaining β-isopropylaminoethyl benzhydryl ether which comprises reacting a β-haloethyl benzhydryl ether with isopropyl amine.

13. Process for obtaining β-allylaminoethyl benzhydryl ether which comprises reacting a β-haloethyl benzhydryl ether with allyl amine.

GEORGE RIEVESCHL, Jr.

No references cited.